United States Patent [19]
Nishimura et al.

[11] Patent Number: 5,679,477
[45] Date of Patent: Oct. 21, 1997

[54] APPARATUS FOR TREATMENT OF A BATTERY CONTAINING ALKALI METAL

[75] Inventors: Katsunori Nishimura; Hidetoshi Honbo; Akihiro Gotoh, all of Hitachi; Mamoru Mizumoto, Hitachinaka; Tatsuo Horiba, Hitachi, all of Japan

[73] Assignee: Hitachi, Ltd., Tokyo, Japan

[21] Appl. No.: 754,094

[22] Filed: Nov. 20, 1996

Related U.S. Application Data

[62] Division of Ser. No. 401,694, Mar. 10, 1995, Pat. No. 5,612,150.

[30] Foreign Application Priority Data

Mar. 16, 1994 [JP] Japan ..................... 6-045371

[51] Int. Cl.[6] .................................................. H01M 6/52
[52] U.S. Cl. ............................................................. 429/49
[58] Field of Search ........................ 429/49; 266/265, 266/271; 29/564.1, 731, 762, 763, 801

[56] References Cited

U.S. PATENT DOCUMENTS

| | | | |
|---|---|---|---|
| 4,637,928 | 1/1987 | Zajec, Jr. et al. | 423/659 |
| 5,491,037 | 2/1996 | Kawakami | 429/49 |
| 5,543,242 | 8/1996 | Tsuchimoto et al. | 429/49 |

*Primary Examiner*—Anthony Skapars
*Attorney, Agent, or Firm*—Antonelli, Terry, Stout & Kraus, LLP

[57] ABSTRACT

A safe and controllable method of treating a secondary battery having at least one component containing alkali metal, comprises the steps of opening the battery casing, and introducing a gas containing at least one of water vapor and alcohol vapor into a closed chamber containing the battery thereby to form alkali metal hydroxide. To control hydrogen concentration, the rate of introduction of water and/or alcohol vapor may be varied. Apparatus for carrying out this method is also described.

11 Claims, 2 Drawing Sheets

APPARATUS FOR TREATMENT OF A BATTERY CONTAINING ALKALI METAL

This application is a Divisional application of application Ser. No. 401,694, filed Mar. 10, 1995; now U.S. Pat. No. 5,612,150.

BACKGROUND OF THE INVENTION

1. Field of the Invention

This invention relates to a method of treating a secondary battery having at least one component containing alkali metal, e.g. lithium, and to apparatus for treatment of such a battery, in order to enable safe extraction and recovery of the alkali metal and optionally other components. In batteries, alkali metal may be present as the metal or in alloy form or as an intercalation compound, and the invention is applicable to all these forms.

2. Description of the Prior Art

A high energy density battery such as a lithium battery includes an active material of its negative electrode in the form of highly reactive alkali metal and an electrolytic solution containing $LiPF_6$ or $LiAsF_6$ which are reactive with water to produce HF. The battery typically further includes a positive electrode containing metal components capable of being regenerated. However, there has been not described any method of industrially processing spent batteries such as lithium batteries or any apparatus for processing such batteries.

The demand for high energy density batteries shows a yearly increase, and problems arise in terms of effective utilisation of chemical materials used in secondary batteries and of environmental pollution caused by batteries. For example, lithium and transition metal elements (Mn, Co) used in a lithium battery are valuable materials suitable to be regenerated. Moreover, a lithium secondary battery capable of being charged and discharged has been extensively used as a power supply for back-up of a computer or a power supply of small size domestic electric equipment, and is expected to be used for power storage or as a future power supply for an electric automobile. Accordingly, there must be developed a method of processing batteries and a method regenerating battery materials for suppressing environmental pollution due to chemical materials contained in the spent batteries and for effectively recovering such components used in batteries.

European patent application 94105151.8 (now published as EP-A-618633) and pending USA patent application 08/220 220 describe a process of treating a lithium battery by contacting the lithium in the battery with a liquid alcohol, to form an insoluble reaction product, followed by supply of liquid water and alcohol to form LiOH. The solution of LiOH in water and alcohol can then be withdrawn from the battery. The present invention takes a different approach to the problem.

SUMMARY OF THE INVENTION

The object of the present invention is to provide a method of treating a battery containing an alkali metal component which is excellent in safety and efficiency, and enables recovery of chemical materials capable of being regenerated, and to provide an apparatus for processing a battery accordingly.

The present inventors have analysed the problem of treating batteries containing alkali metal and reached the following conclusions.

Since a high energy density battery using an alkali metal, such as a lithium battery, contains active materials, i.e. reactive alkali metal and electrolytic solution which is unstable in contact with water vapor, attention should be paid to controlling the atmospheric gas when destroying a battery vessel. For example, the negative electrode of a lithium battery utilises lithium metal, a lithium alloy, an intercalated lithium compound or a carbon compound electrochemically containing lithium, any of which reacts strongly with water to generate hydrogen gas. Moreover, a nonaqueous electrolytic solution containing a fluorine compound such as $LiPF_6$ reacts with a water content in air, possibly to generate a harmful gas such as pentafluorophosphide or hydrogen fluoride. Accordingly, to destroy the vessel of a high energy density battery using an alkali metal and to expose battery components, the humidity of the external gas is desirably controlled.

To inactivate a high energy density battery with safety, the following functions may be performed: the battery casing is opened in a dry atmosphere and then reactive battery components and electrolytic solution are decomposed in a controlled atmosphere based on an inert gas, nitrogen gas or air. Moreover, to suppress the abrupt decomposition of such active components of the battery and prevent explosion of an inflammable gas such as hydrogen, and to shorten the decomposition time as much as possible, it is desirable to use a method of controlling the decomposition rate. In the case where the concentration of valuable material contained in the waste liquid obtained after processing of the battery is low, there may be required an enriching process; accordingly, to improve the regenerating efficiency of valuable materials and to shorten the battery processing time, it is desirable to fractional-recover the battery processing liquids according to the contents of the valuable materials, that is to say to recover two or more separate liquids after contact with the battery components.

According to the invention in one aspect, there is provided a method of treating a secondary battery comprising at least one component containing alkali metal, comprising the step of introducing a gas containing at least one of water vapor and alcohol vapor into a closed chamber containing at least this component, thereby to form alkali metal hydroxide or alkoxide. The chamber or the gas introduced may contain substantially no oxygen gas, but atmospheric air may be used as a carrier gas for the water vapor.

The water content in the introduced gas is preferably in the range 0.5 to 3 g per litre of gas. The gas temperature is preferably in the range 100° to 150° C. The alcohol content is preferably in the range 0.5 to 5 g per litre of gas.

When processing a large amount of battery components, an abrupt evolution of hydrogen may occur if water is added to alkali metals contained in battery. A hydrogen explosion can take place if the hydrogen concentration is higher than 4% in air. However, the water decomposition method hardly controls the rate of hydrogen evolution, because water has an extremely high reactivity to alkali metals. On the other hand, addition of water vapor to battery components can solve this problem. Water vapor content in a gas is easily controlled, so that the evolution rate of hydrogen can be suppressed under the limit which makes hydrogen explosive.

At the initial stage of the processing of alkali metals included in batteries, the water vapor content of the gas may be lower. The alkali metal is gradually decomposed into hydrogen and alkali hydroxide. As the decomposition rate decreases, the water vapor content is made higher to continue the decomposition reaction. After most of the active materials is decomposed, then liquid water may be added to complete the decomposition processing.

Instead of water vapor, alcohol vapor such as methanol, ethanol, propanol, butanol and the like is the alternative which can be used in processing alkali metals included in batteries at the initial stage. The alcohol reacts with alkali metals yielding hydrogen and alkali metal alkoxides. As solubilities of the alkoxides in alcohols are low, they cover the surface of the active materials as the processing advances. Accordingly, water vapor or mixture of water vapor and alcohol vapor may be supplied instead of the alcohol vapor. Water in the gas can decompose the alkoxide into alkali hydroxides and alcohols, which are very soluble into water. After most of the active materials is decomposed, liquid water may be added to complete the decomposition processing.

For safety reasons, it is preferred to control the hydrogen concentration. Preferably, the method includes controlling the hydrogen gas concentration in the chamber to below 4% by volume. The hydrogen concentration may be controlled by adjusting at least one of the rate of introduction of water or alcohol vapor into the chamber, the temperature in the chamber and the temperature of the introduced gas. Suitably, at least one of the water concentration in the gas and the temperature of the gas is increased during the treatment of the battery.

The method may include the step of contacting components of the battery with an aprotic solvent to remove electrolyte therefrom, before contacting the component containing alkali metal with the introduced gas.

The invention in its method aspect can also provide a method of treating a secondary battery comprising at least one component containing alkali metal, to extract alkali metal therefrom, comprising the steps of exposing the component containing alkali metal to a gas containing at least one of water vapor and alcohol vapor so as to form alkali metal hydroxide or alkoxide, and separating the alkali metal hydroxide or alkoxide from other constituents of the battery.

The step of separating the alkali metal hydroxide may comprise adding water to form a solution thereof and separating the solution from remaining solid constituents.

Yet further, the invention provides a method of converting an alkali metal in a secondary battery into alkali metal hydroxide or alkoxide by contacting the alkali metal with water, wherein the improvement comprises contacting the alkali metal with a gas containing at least one of water vapor and alcohol vapor, and controlling the hydrogen concentration by control of the supply rate of water vapor.

The invention also provides a method of converting alkali metal present in a secondary battery to alkali metal hydroxide, comprising exposing the alkali metal to a gas containing at least one of water vapor and alcohol vapor in a closed chamber and extracting hydrogen gas evolved in said chamber by reaction of the vapor with the alkali metal, so as to maintain a concentration of hydrogen gas in said chamber below a predetermined safe concentration thereof.

Apparatus according to the invention for treatment of a battery comprising a component containing an alkali metal, comprises means for opening an outer casing of the battery, a closable chamber to receive the battery, and means for introducing to said chamber a gas containing at least one of water vapor and alcohol vapor. Preferably there are means for separating alkali metal hydroxide formed by reaction with said alkali metal from solid components of the battery.

This apparatus may have a hydrogen concentration sensor for sensing hydrogen concentration in the chamber and means for adjusting the rate of introduction of the water vapor or alcohol vapor in dependence on the sensed hydrogen concentration. Further, it may have a temperature sensor for sensing temperature in the chamber and means for adjusting the rate of introduction of the water vapor or alcohol vapor in dependence on the sensed temperature.

In another aspect, the invention provides apparatus for treatment of a battery comprising a component containing an alkali metal, comprising means for opening an outer casing of the battery, a closable chamber to receive the battery, means for introducing to the chamber a gas containing at least one of water vapor and alcohol vapor, a sensor for monitoring the reaction with alkali metal in said chamber and means for controlling the introduction of said gas in dependence on an output of said sensor. The sensor is preferably selected from (a) a pressure sensor for sensing pressure in the chamber, (b) a temperature sensor for sensing temperature in the chamber and (c) a hydrogen concentration sensor for sensing hydrogen concentration in the chamber.

In yet another aspect, the invention provides apparatus for treatment of a battery comprising a component containing an alkali metal, said apparatus comprising a closable chamber having a plurality of intercommunicating compartments comprising at least (a) a first compartment provided with means for opening an outer casing of said battery, and (b) a second compartment having means for introducing thereto a gas containing water vapor for reaction with said alkali metal.

The apparatus may include means for agitating, e.g. vibrating, the battery components during the treatment or means for stirring the battery components.

Further preferred and optional features of the invention and methods and apparatus of carrying it out will now be described generally.

To efficiently and safely decompose and recover active materials such as a battery active material and electrolytic solution contained in a high energy density battery, the battery is processed while controlling the decomposition rate of the target materials. The method of processing a battery according to the present invention has an advantage in that the decomposition rate of an active material of the negative electrode can be controlled by use of a processing gas containing the vapor of a material reactive with the active material, and further by adjusting at least one of the supply rate, concentration and temperature of the processing gas. As for the electrolytic solution, it may be separately recovered using a suitable cleaning liquid.

The battery processing apparatus of the present invention typically includes a processing chamber for processing an active material of a battery in a controlled atmosphere, which may be based on a dry inert gas, nitrogen gas or air. It is desirable to prevent the entrapment of an external water content in the processing chamber when a battery is moved between the processing chamber and the outside of the apparatus. For this purpose, there is proposed a method of using an inlet-chamber (lock chamber) capable of replacing the gas atmosphere from the atmospheric air with the dry gas by means of a vacuum pump. In this method, a port of the preparing chamber is first opened to move the battery into the inlet chamber; the port is closed to allow evacuation of the atmospheric air in the preparing chamber; dry atmospheric gas is introduced into the inlet chamber; and a port separating the inlet chamber from the processing chamber is opened to allow the battery to move into the processing chamber. In this method, since the processing chamber is not opened to the atmospheric air, the dry state in the processing chamber is maintained. Moreover, to improve the operability of the battery processing apparatus, to reduce the operational cost, and to shorten the battery processing time, there may be provided an inlet chamber having an air curtain mechanism of a dry gas at the entry port of the processing chamber, thereby maintaining the dry state of the interior of the processing chamber in a more simple manner as compared with the above-described gas replacement system.

Next, there will be described one preferred process of inactivating a high energy density battery containing an alkali metal. First, a battery is completely discharged outside the apparatus of the present invention. A suitable method of discharging the battery is by short-circuiting the terminals of the battery by way of a resistor or by dipping the battery in a solution containing sodium chloride or a dilute acid. In the latter method, the battery discharge is accompanied by corrosion of the battery casing so that a large number of small size batteries, of the AA size for example, may be treated together at one time. After being discharged in this way, the battery is carried into the processing chamber by way of the inlet chamber. A drive type transporting device such as a belt conveyor may be provided between the inlet chamber and the processing chamber for easy movement of the battery therebetween. The inlet chamber has a gas supply system and a gas exhaust system for communicating the dry atmospheric gas to the inlet chamber even when it uses either an air curtain system or gas replacement system. Moreover, to exhaust a combustible gas such as hydrogen gas generated in the inactivation of the battery or a harmful gas such as $PF_5$ from the processing chamber, the processing chamber has a gas supply system and gas exhaust system. While the humidity in the processing chamber is controlled, the battery components are exposed using a battery crusher, such as a hammer crusher, having a function of crushing the battery together with the casing, or a battery disjointing device, such as a grinder or a diamond cutter, having a function of cutting the casing of the battery and taking out the battery components. The processing chamber is connected to a supply system and exhaust system of a processing gas and liquid.

After the battery components are exposed inside or outside the battery casing, the electrolytic solution contained in the battery vessel, electrodes, separator and the like is removed using a cleaning liquid. As the cleaning liquid, there may be used an aprotic organic solvent such as propylene carbonate, 1,2-dimethoxyethane, diethoxyethane or the like. By distilling the waste cleaning liquid, the electrolyte can be recovered. Next, nitrogen gas, other inert gas (e.g. Ar or He) or air containing water or alcohol vapor in dilute form is introduced into the processing chamber, to gradually decompose the active material of the negative electrode.

The water content in the introduced gas is preferably in the range 0.5–2 g per litre, and the preferred temperature of the gas is in the range 100°–150 ° C. Relative humidity of the gas may be 80–100%. Alternatively, vapor of an alcohol such as methanol, ethanol, propanol and butanol is present in the gas. Preferable alcohol content in the processing gas is 0.5–5 g per litre. A mixture of water vapor and alcohol vapor (e.g. in the amounts given above), which is more reactive to alkali metal than the respective alcohol, is also useful in decomposition to alkali metals. The processing is performed by injecting the processing gas to the component. The processing gas may be introduced from the liquid supply system connected to the processing chamber. At the initial stage, the processing gas decomposes the negative electrode, and it may become less reactive to the electrode in the progress of the processing. In this case, liquid water or a liquid mixture of water and alcohol is sprayed or dropped onto the negative electrode. These liquids are introduced from the supply system of the processing gas, if the vapor generator is switched off. The spent processing gas is exhausted from the processing chamber by way of the liquid exhaust system.

The concentration of hydrogen gas generated during the processing of the negative electrode desirably should for safety reasons be less than the explosion limit, preferably 4% or less. The hydrogen gas accumulating in the processing chamber is readily exhausted from the processing chamber together with the inert gas, nitrogen gas or air introduced into the processing chamber. A gas separator is mounted in the gas exhaust system for recovering hydrogen gas.

For execution of the above described process, there may be used apparatus having a processing chamber and including: a processing gas supply system having storage vessels storing a plurality of processing materials, supply ports for processing gas, and a waste liquid exhaust system having exhaust ports for the spent processing liquids and waste liquid storage vessels. For processing the negative electrode using water vapor, a humidifying device having a function for controlling the water vapor concentration is mounted in the processing gas supply system. Gas flow rate control means are provided. A plurality of gas supply ports may be provided in the processing chamber; or supply ports for introducing different processing gases to a plurality of processing chambers may be provided in a plurality of the processing chambers, to process the batteries using processing gases which are different in reactivity in a stepwise manner from each other. The gas supply means may apply liquids, when the gas supply is stopped.

The automation of the operation of the above-described battery processing apparatus is desirable to improve the efficiency and safety of the processing of the battery. To automate the apparatus, there are provided for example a flow rate controller for controlling the supply amount and exhaust amount of processing gas; a sensor for measuring the pressure, temperature and hydrogen concentration in the processing chamber; and an arithmetic and control unit for controlling the flow rate controller of the processing gas according to the state of the processing chamber monitored by the sensor. The flow rate controllers may be provided in the supply pipe and exhaust pipe connected to the inlet chamber and the processing chamber. The sensor is provided in the processing chamber, and may include a temperature sensor, infrared ray sensor or hydrogen sensor. The measured data such as the temperature and the hydrogen concentration in the processing chamber are transmitted from the sensor to the arithmetic control unit. The arithmetic and control unit operates the flow rate controllers and vapor generators according to the analyzed result of the measured data for adjusting the supply amount and exhaust amount of the processing gas or liquid, and the temperature of the gas and the vapor content, as desired. When an abnormal decomposition rate occurs midway in the processing of the battery, the introduction of the processing gas may instantly be stopped or a large amount of an inactive liquid may be added to the active material being decomposed, to suppress the decomposition. Moreover, it is possible to easily exhaust the combustible gas such as hydrogen which maybe excessively generated, through the exhaust system. By incorporating such a controlling system in the apparatus, the operation of the battery processing apparatus can be automated, thus improving the efficiency and safety of the decomposition process of the battery.

Various materials can be recovered from the solutions produced by the methods of the invention. Alkali metal can be extracted from the hydroxide by distilling to obtain oxide, followed by electrolysis. Electrolyte may be recovered by vacuum distillation. Other metals such as Co, Ni, Fe and Al can be recovered from the battery components also, by processes such as incineration, reduction and electrolysis.

The cost required to recover valuable materials from the waste liquid in processing of the battery is dependent on the concentration of the target material contained in the waste processing liquid exhausted from the battery processing apparatus. For recovering the target material from the waste liquid having a low concentration, a process of enriching the waste liquid by extraction or distillation is required, which increases the recovery cost. In the present invention, it becomes possible to fractional-recover the waste processing liquid exhausted from the battery processing chamber, to enrich only the processing liquid low in the concentration of the valuable material, and to recover the valuable material from all the waste processing liquid. Materials which may be recovered are alkali metals and transition metals such as Fe, Ni, Mn, Co. Alkali metal may be obtained by extraction and electrolysis, while transition metals may be obtained by various metallurgical processes such as incineration, reduction and electrolysis. The battery processing apparatus of the present invention makes it possible to fractional-recover the waste processing liquids of valuable materials having different concentrations, and to reduce the cost in regenerating the valuable materials.

In the case of using water vapor as a reactive material for decomposing the negative electrode, a carrier gas such as an inert gas, nitrogen or air mixed with water vapor is contacted with the negative electrode, to decompose the active material of the negative electrode. When using water and alcohol vapors, the contents in the carrier gas may be controlled by varying the mixing ratio of alcohol and water. At the initial stage of decomposition, the concentration of water and/or alcohol vapor is kept low to reduce the reactivity of the processing, thus suppressing the abrupt decomposition of the active material of the negative electrode. As the decomposition proceeds, decomposition products such as alkoxides become deposited on the surface of the component. By increasing the water and/or alcohol vapor concentration as the decomposition rate of the negative electrode is lowered, the reactivity of the gas is increased and decomposition of the negative electrode is continued. Finally, liquid water may be directly contacted with the negative electrode, thus completing the decomposition and solution of the alkali metal as hydroxide. This method is effective to reduce the cost of the processing liquid and to reduce the environment load due to the waste processing liquid.

The processing gas may initially contain an alcohol, or the alcohol may be included after an initial period when water vapor only is present in the processing gas. The water vapor reacts to generate alkali metal hydroxide. If a solution is produced in the chamber, it may be removed as it is, or water may be added, when the reactivity of the battery residue is much reduced, to form a solution to be withdrawn.

INTRODUCTION OF THE DRAWINGS

Embodiments of the invention will now be described by way of non-limitative example, with reference to the accompanying drawings, in which.

DESCRIPTION OF THE PREFERRED EMBODIMENTS

Figure 1:
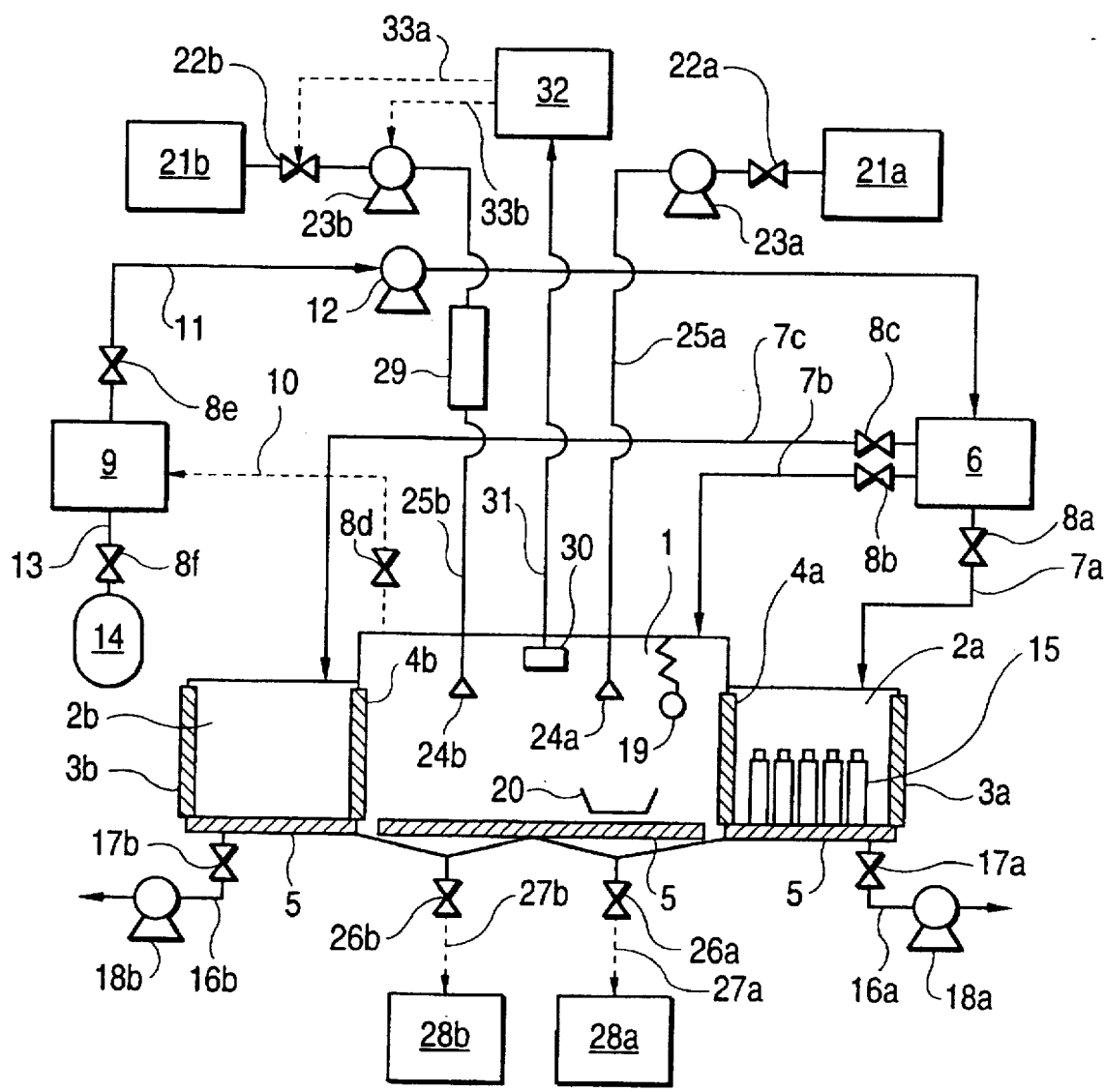
FIG. 1 is a diagrammatic view of a lithium battery processing apparatus including ports with a sliding type door according to one embodiment of the present invention.

In the several drawings, the same reference numerals identify the same or corresponding elements.

FIG. 1 shows a battery processing apparatus of the present invention, which includes a processing chamber 1 and inlet and outlet chambers 2a and 2b respectively connected to opposite sides of the processing chamber 1. The processing chamber 1 and each of the chambers 2a and 2b have outer sizes of 1 m×1 m×2.5 m and 0.5 m×0.5 m×1 m, respectively. Ports 3a and 3b, each having an opening/closing plate, are respectively mounted at the outer side of the chambers 2a and 2b for maintaining the air-tightness of the chambers 2a and 2b. Ports 4a and 4b, each having an opening/closing plate, are provided between the chambers 2a and 2b and the processing chamber 1. A belt conveyor indicated at 5 is provided within this apparatus for transporting a battery, battery components and the like. Three sets of gas supply systems including a gas supply device 6 for drying and supplying an atmospheric gas, gas supply pipes 7a, 7b and 7c, and valves 8a, 8b and 8c are connected to the processing chamber 1 and the inlet and outlet chambers 2a and 2b. In this embodiment, as the atmospheric gas, nitrogen gas is used.

To recover the hydrogen gas generated in the processing chamber 1 during the processing of a battery, the gas in the processing chamber 1 is transported to a gas separator 9 by way of a gas exhaust pipe 10 having a valve 8d. The hydrogen is separated from the gas at the gas separator 9, and is recovered in a gas storage vessel 14 connected to a transporting pipe 13 having a valve 8f. To store hydrogen gas, a hydrogen storage alloy such as $LaNi_5$ is present in the gas storage vessel 14. The nitrogen gas remaining in the gas separator 9 is transported to the gas supply device 6 by way of a transporting pipe 11 having a gas transporting pump 12 and a valve 8e. Upon decomposition of a negative electrode, nitrogen is circulated by opening the valves 8b, 8d and 8e and continuously driving the pump 12.

The apparatus has means 21b for supplying humidified air via a flow rate control valve 22b, an optional liquid pump 23b through a pipe 25b and via a heater 29 to an injector 24b in the processing chamber. The water vapor content of the air can be adjusted. This arrangement is also capable of supplying liquid water. Alternatively, separate means for supplying humidified gas and liquid water respectively may be provided.

EXAMPLE 1

In this example, five 3 Wh lithium secondary batteries are processed, each of which includes a positive electrode made of $LiCoO_2$, a negative electrode made of a lithium-lead alloy, and an electrolyte made of an organic electrolytic solution containing $LiPF_6$. The battery has a cylindrical shape having a diameter of 18 mm ⌀ and a length of 65 mm. First, outside the battery processing apparatus shown in FIG. 1, each battery was short-circuited by way of a resistor of 10Ω to be perfectly discharged. The port 3a was opened, and each battery 15 was placed on the belt conveyor 5 in the inlet chamber 2a, after which the port 3a was closed. The valve 8a was then closed and a valve 17a mounted in a gas exhaust pipe 16a was opened.

After that, an exhaust pump 18a was operated, to evacuate air present in the inlet chamber 2a. After the inlet chamber 2a was evacuated, the valve 17a was closed and the pump 18a was stopped. Next, dry nitrogen gas was supplied to the inlet chamber 2a by way of the gas supply pipe 7a. The port 4a was then opened, and the batteries 15 were moved to the processing chamber 1, after which the port 4a was closed.

The casing of the batteries was crushed in the processing chamber 1 by means of a battery crusher 19 including a hammer crusher and a cutter mixer. The crushed pieces were stored in a polypropylene vessel 20 having its bottom surface provided with a polypropylene fibre mesh material as a filter. The time required for crushing was 20 min.

In this example, 1,2-dimethoxyethane is used for cleaning the electrolytic solution adhering to the battery crushed pieces. A liquid storage vessel 21a, in which 1,2-dimethoxyethane is stored, is connected to the processing chamber 1 by means of a pipe 25a including a valve 22a, a liquid transporting pump 23a and a sprayer 24a. 1,2-dimethoxyethane in an amount of 1 litre was sprayed onto the battery crushed pieces stored in the vessel 20 at a rate of 100 ml/min, to clean the electrolytic solution from the battery pieces. The bottom surface of the processing chamber 1 was formed in a conical shape at two portions for collecting the cleaning liquid supplied from the sprayer 24a. The collected cleaning liquid was stored in a waste liquid storage vessel 28a by way of a processing liquid exhaust pipe 27a having a valve 26a.

Next, the belt conveyor 5 was driven, and the vessel 20 was carried to a portion under the injector 24b.

A telescopic joint capable of adjusting height was mounted on the liquid supply pipe 25b and the injector 24b was attached at the leading end thereof. The injector 24b was moved to be close to the vessel 20 containing the crushed battery pieces, and it injected air at 100° C. containing water vapor with a humidity of 90% to the crushed pieces at a rate of 1000 ml/min. Water bubbles were gradually generated from the crushed pieces, to thus decompose the active material of the negative electrode.

After an elapse of 25 min, the heater 29 heated the humidified air to 150° C. The humidified air was then further injected onto the crushed pieces for 30 min at the same rate. Next, the supply of the humidified air from means 21b was stopped, and only water was supplied from the means 21b, so that water was added to the battery crushed pieces by the pump 23b at a rate of 100 ml/min. The waste water was stored in the waste liquid storage vessel 28b by way of the pipe 27b. After an elapse of about 15 min, the desired decomposition of the crushed pieces was completely finished, and the battery crushed pieces were then taken from the preparing chamber 2b as described below.

The hydrogen gas generated during treatment of the batteries was exhausted to the gas separator 9 by way of the gas exhaust pipe 10 together with air. The hydrogen gas recovered by the gas separator 9 was stored in the storage vessel 14 including LaNi$_5$ alloy by way of the pipe 13 having the valve 8f which was opened, and was stored in the storage vessel 14 including LaNi$_5$ alloy. The gas remaining in the gas separator 9 was returned to the gas supply device 6 by way of the pipe 11.

To remove the residue of the batteries, the atmospheric air in the chamber 2b was exhausted by a gas exhaust system including a valve 17b, a pump 18b and a gas exhaust pipe 16b. The valve 17b was then closed, after which the valve 8c was opened and dry nitrogen was introduced into the outlet chamber 2b by way of the gas supply pipe 7c. After the chamber 2b was filled with dry nitrogen, the plate of the port 4b was opened, and the vessel 20 was moved into the outlet chamber 2b. The plate of the port 4b was closed and the plate of the port 3b was then opened, and thus the vessel 20 containing the crushed pieces was taken from the chamber 2b.

The waste water stored in the waste liquid storage vessel 28b was distilled and the lithium metal was recovered by electrolytic refining. Lithium was recovered from the crushed residue by extraction and electrolysis. The recovered ratio of lithium was 95% based on the total amount of lithium contained in five cylindrical lithium secondary batteries.

From the 1,2-dimethoxyethane solution of LiPF$_6$ stored in the waste liquid storage vessel 28a, LiPF$_6$ was recovered by vacuum distillation.

EXAMPLE 2

50 cylindrical lithium secondary batteries each having the same specification as those processed in the Example 1, were previously discharged in a salt water containing sodium chloride or the like and processed in the battery processing apparatus shown in FIG. 1. First, each lithium battery was dipped for two days in a salt water containing sodium chloride in an amount of 50 g per 2 l of water. By this, part of the battery vessel was corroded. Each battery was carried into the processing chamber 1 by the same procedure as in Example 1, and was crushed using the battery crusher 19 having the hammer crusher and the cutter mixer. The crushed pieces were then stored in the polypropylene vessel 20 having the bottom surface provided with the mesh. The time required for crushing the batteries was 20–23 min. The batteries in the number being 10 times that of the batteries in the Example 1 were crushed for about the same time. As in this embodiment, by corroding the vessel of the batteries in a solution containing a salt such as sodium chloride or potassium chloride or a diluted hydrochloric acid, the time required for crushing of batteries could be shortened even when the number of the batteries was increased. 1,2-dimethoxyethane stored in the liquid storage vessel 21a was added to the battery crushed pieces for 20 min at a rate of 100 ml/min, to clean the electrolytic solution stuck on the crushed pieces. The waste cleaning liquid was stored in the waste liquid storage vessel 28a. Subsequently, water stored in the liquid storage vessel 21b was heated at the heater 29 to produce an air-water vapor mixture gas containing 0.5 g water per 1 l at 100° C. The gas was injected onto the crushed pieces of the batteries at a rate of 1 l/min for 40 min. During decomposition of lithium-lead alloy particules in the crushed materials, the hydrogen concentration in the processing chamber was kept below 0.5% or less. No evolution of hydrogen from the crushed pieces was observed after supplying the gas for an elapse of 60 min. Finally 1 l of liquid was added to the crushed pieces to terminate decomposition of the lithium alloy. In this example, the total time required for processing fifty 3 Wh lithium secondary batteries 15 was about 1.8–2.0 hr. The volume of aqueous liquid containing lithium ions recovered in the waste liquid storage vessel 28b was 0.8–0.9 l. By electrolytic refining, 20% of lithium metal contained in the original lithium batteries was recovered. From the residue obtained from the vessel 20, lithium cobalt, iron, and aluminium was re-generated by incineration and reduction or electrolysis. Nearly 85% of the total amount of lithium metal in the lithium batteries was recovered. The regenerated amounts of cobalt, iron and aluminium were 75–80% of the amounts initially contained in the batteries. From the 1,2- dimethoxyethane solution of LiPF$_6$ remaining in the waste liquid storage vessel 28a, 93% of LiPF$_6$ was recovered by vacuum distillation.

EXAMPLE 3

Using five pieces of the lithium batteries having the same specification as those in the Example 1, an experiment was made to shorten the time required for processing the batteries. 1,2-dimethoxyethane was used as a cleaning liquid for recovering an electrolytic solution of the batteries. Each battery was crushed using the battery crusher 19 having the hammer crusher and the cutter mixer in the same procedure as in the Example 1. The crushed pieces were stored in the polypropylene vessel 20 with a polypropylene filter. 1,2-dimethoxyethane in an amount of 1 l was added to the crushed battery components at a rate 100 ml/min from the sprayer 24a. The waste cleaning liquid was stored in the waste liquid storage vessel 28a. The vessel 20 containing the battery crushed pieces was placed directly under the injector 24b. First, in such a state that the heater 29 was operated, gas at 150° C. was injected onto the battery crushed pieces at a rate of 1 l/min from the injector 24b using nitrogen gas carrier. Water content was 1 g per litre. The time required for supplying the processing gas was 30–35 min. The hydrogen concentration in the processing chamber 1 during the processing of the negative electrode was 1% or less, and accordingly the negative electrode could be safely decomposed without the fear of explosion of hydrogen. Water in liquid form was added to complete the decomposition. The waste liquid stored in the waste liquid storage vessel 28a was distilled in vacuum, and thereby 95% of the total LiPF$_6$ contained in the batteries was recovered. The waste liquid stored in the waste liquid storage vessel 28b was subjected to electrolytic refining, to recover 25% of the total lithium metal contained in the batteries. From the residue obtained from the vessel 20, lithium, cobalt, iron, and aluminium was regenerated by incineration and reduction or electrolysis. Nearly 83% of the total amount of lithium metal in the lithium batteries was recovered. The regenerated amounts of cobalt, iron and aluminium were 75–80% of the amounts initially contained in the batteries.

EXAMPLE 4

The battery processing time may be shortened by agitating crushed battery components during supply of the gas. Five pieces of the lithium secondary batteries having the same specification as those in Example 1 were processed. Each lithium battery was discharged through a resister of 10Ω and was crushed using the battery crusher 19 having the hammer crusher and the cutter mixer in the processing chamber 1. The crushed pieces were put in the polypropylene (PP) vessel 20 with the PP filter. They were cleaned with 1,2-dimethoxyethane supplied from the liquid storage vessel 21a. The processing gas contains water vapor at 0.5 g/l at 100° C. It was supplied from the nozzle 24b to the crushed pieces of batteries in the PP vessel 20. The flow rate of processing gas was 1 l/min. Next, a rotary mixer was inserted in the vessel 20 containing the battery crushed pieces, and the pieces were agitated. After the generation of hydrogen was no longer observed from the crushed pieces, the liquid product was discharged from the vessel 20 to the waste liquid storage vessel 28b by way of the liquid exhaust pipe 27b. Finally, 1 l of water at 25° C. was added to the crushed pieces from the nozzle 24b, after the steam generator 29 was switched off. The decomposition time by the gas was 18–20 min, and the total battery processing time was 1.3–1.4 hr. The battery processing time was shortened compared with Example 1 by the agitation of the crushed component. The waste liquid stored in the waste storage vessel 28a was distilled in vacuum, so that 95% of the total LiPF$_6$ contained in the batteries was recovered. The waste processing liquid stored in the waste liquid storage vessel 28b and the residue of the crushed battery pieces was subjected to electrolytic refining, to recover 80% of the total lithium metal contained in the batteries.

In FIG. 1 a hydrogen sensor 30 having a function of detecting the hydrogen concentration in the processing chamber 1 is provided in the processing chamber 1. The hydrogen sensor 30 was connected to an arithmetic and control unit 32 though a signal input cable 31. The arithmetic and control unit 32 is connected to the flow rate adjuster 22b and the liquid supply pump 23b by means of signal input cables 33a and 33b, respectively. The hydrogen sensor 30 measures the hydrogen concentration in the processing chamber 1, and transmits an electric signal proportional to the measured value to the arithmetic and control unit 32. The arithmetic and control unit 32 calculates the electric signal supplied from the hydrogen sensor 30, and transmits the electric signal corresponding to the processing result to the flow rate adjuster 22b or the liquid supply pump 23b for controlling their operation. In this embodiment, the allowable value of hydrogen concentration and the total supply amount of the processing gas are previously stored in a memory unit of the arithmetic and control unit 32, and the calculating condition of the arithmetic and control unit 32 may for example be in accordance with the following items (1) to (5) singly or in combination.

(1) When the hydrogen concentration in the processing chamber 1 is smaller than the allowable value, the arithmetic and control unit 32 controls the flow rate adjuster 22b for increasing the supply rate of the processing gas. In this embodiment, the permitted hydrogen concentration in dry gas is within the range from 0 to 4%.

(2) When the average hydrogen concentration in the processing chamber 1 is less than 0.01% for a selected period, e.g. in the range 1 to 5 minutes, the supply of processing gas or liquid is stopped.

(3) When an electric signal transmitted from the hydrogen sensor 30 to the arithmetic and control unit 32 is abruptly increased to more than a hydrogen concentration allowable value, the flow rate adjuster 22b and pump 23b are closed by way of the signal input cables 33a and 33b, to stop the processing supply. The hydrogen concentration allowable value in this case may be set at 10%.

(4) The arithmetic and control unit 32 accumulates the supply amount of the water and the accumulated value is stored in the memory unit of the arithmetic and control unit 32.

(5) When the accumulated value in (4) reaches the upper limit of the total supply amount of the processing water stored in the memory unit of the arithmetic and control unit 32, the flow rate adjuster 22b and pump 23b are closed.

EXAMPLE 5

The apparatus shown in FIG. 1 was operated under the control conditions described above. Five lithium batteries 15 of the same specification as those in Example 1 were crushed in the battery crusher 19 and the electrolyte was cleaned off as in Example 1. Then the active materials of the negative electrodes were decomposed with the water vapor containing gas. The gas contained water of 0.5 g/l at 100° C., and the carrier gas was nitrogen. It was supplied from the nozzle 24b to the crushed pieces of the batteries. The processing time was 25 min. After this treatment, water (1 l) was added to the pieces from nozzle 24b. The water amount supplied from the liquid storage vessel 21b was 4l. The total time required for putting the batteries in the processing apparatus and taking the battery crushed pieces from the processing apparatus was 1.4–1.5 hr. The waste cleaning liquid stored in the waste liquid storage vessel 28a was distilled in vacuum, so that 95% of the total $LiPF_6$ of the batteries was recovered. The water processing liquid stored in the waste liquid storage vessel 28b was subjected to electrolytic refining, and 23% of the total lithium metal of the batteries could be recovered. Metallurgical methods such as extraction and reduction recovered 60% lithium from the crushed pieces. In this embodiment, as compared with Example 1, it becomes possible to shorten the battery processing time, and to automate the battery processing allowing unmanned operation.

In a variation of the embodiment of FIG. 1, to shorten the battery processing time, the preparing chambers 2a and 2b each have an air curtain mechanism. The ports 3a, 3b, 4a and 4b include sliding type opening/closing plates. In this apparatus, the gas storage vessel 6 was replaced by a supply device 6 for usually supplying dry air to the processing chamber 1 and the preparing chambers 2a and 2b. Moreover, the gas exhaust pumps 18a and 18b were not required. When the port 3a was opened, dry air was supplied from the dry air supply device 6 to the preparing chamber 2a. The dry air was discharged to the exterior of the apparatus through the gas exhaust pipe 16a by opening of the valve 17a. With this air curtain mechanism, humidified air outside the apparatus was not permitted to enter the processing chamber 1. Even when the processed battery components were taken from the preparing chamber 2b, dry air was supplied from the dry air supply device 6 to the preparing chamber 2b, and was communicated to the gas exhaust pipe 16b by opening of the valve 17b.

EXAMPLE 6

Five lithium batteries of the same specification as in Example 1 were processed in the modified apparatus just described, by the procedure of Example 3. The time required for the processing of the negative electrode by gas containing water vapor was 25–30 min as in Example 3, and the time required for crushing of the batteries was the same as in the Example 3. The hydrogen concentration in the processing chamber 1 during reaction between ethanol and the battery crushed pieces was maintained at 1% or less. In this embodiment, the gas replacement in the inlet and outlet chambers 2a and 2b was eliminated, thus shortening the total processing time to be 1 hr.

Figure 2:
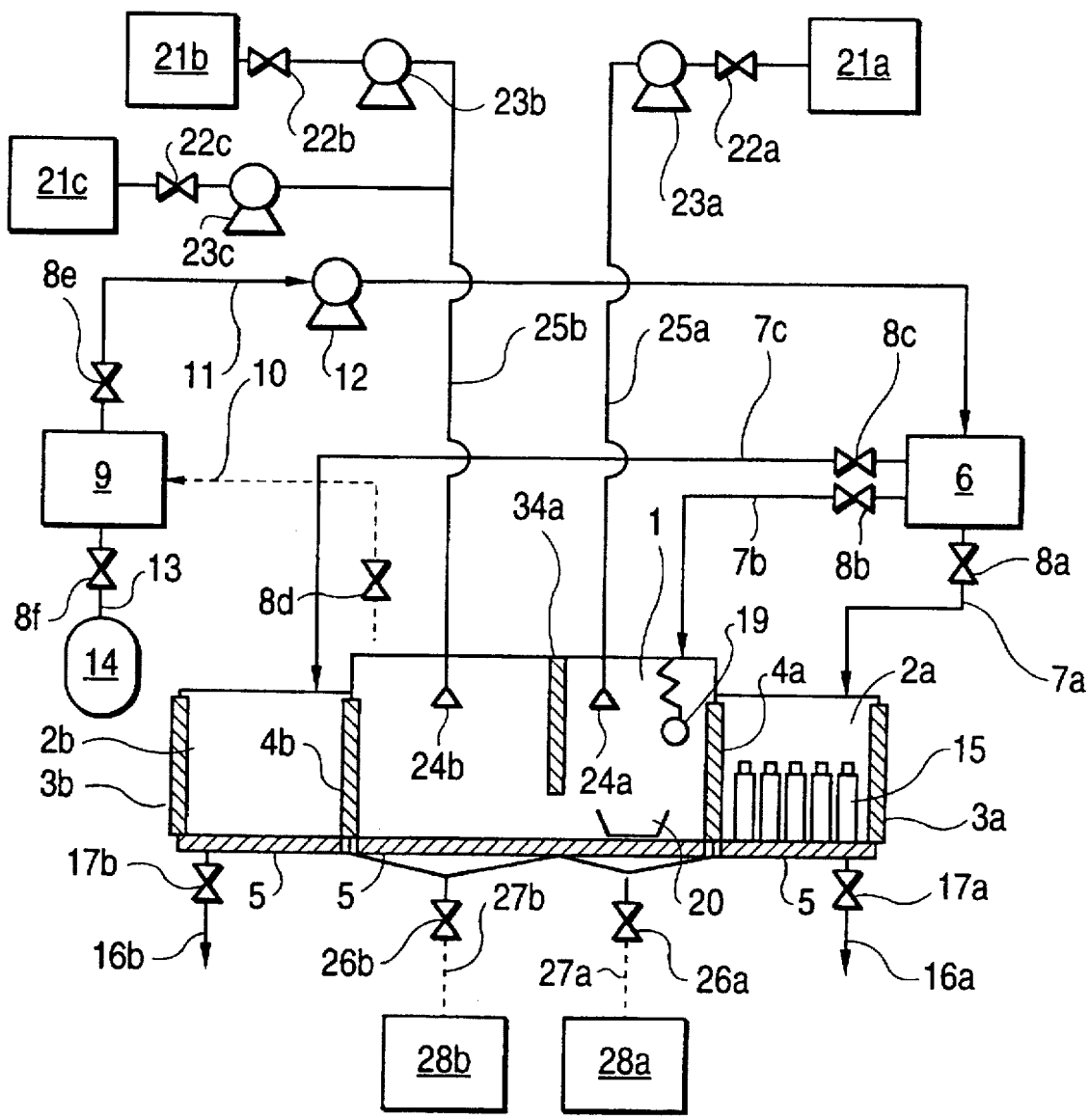
FIG. 2 is a diagrammatic view of a lithium battery processing apparatus in which the processing chamber is partitioned by a partitioning plate according to another embodiment of the present invention.

FIG. 2 is a battery processing apparatus in which two sets of processing fluid supply systems and liquid exhaust systems are independently provided. A partitioning plate 34 is provided in the upper portion of the processing chamber 1 to provide two working areas and sprayers 24a and 24b are provided in the upper portion of the processing chamber 1. Diethoxyethane for cleaning electrolytic solution is stored in a liquid storage vessel 21a, and is introduced from the sprayer 24a to the first compartment of the processing chamber 1 by way of a liquid transporting pipe 25a having a valve 22a and a pump 23a. Ethanol and water are stored in vessels 21b and 21c and are supplied with a carrier gas (dry air) for decomposing a negative electrode from the injector 24b to the second compartment of the processing chamber 1 by way of pipe system 25b having valves 22b and 22c and pump 23b and 23c. The supply means 21b can also supply water vapor only in air, if required. For example a mixture of 50% ethanol and 50% water by weight is supplied. The liquid supply means 21b and 21c have the capability of generating vapors of the liquids by heating.

To individually recover the cleaning liquids or processing liquids used in the partitioned areas, two portions of the bottom surface of the processing chamber 1 were formed in a conical shape, and two waste liquid exhaust pipes 27a and 27b are connected to the two portions. As another method of recovering waste liquids, a partitioning plate is arranged on the bottom surface of the processing chamber 1 under the belt conveyor 5, so that the waste liquids can be fractional-recovered without any mixing of the waste liquids. Valves 26a and 26b control the waste liquid exhaust pipes 27a and 27b, respectively. Dry air to be supplied to the processing chamber 1 and the inlet/outlet chambers 2a and 2c was introduced to the apparatus from a gas supply device 6 having a function of drying air. The dry air was continuously supplied from the gas supply device 6 to the chambers 2a and 2b of the battery processing apparatus by way of a pipe 7a, and was exhausted from a gas exhaust pipe 16a by opening of the valve 17a.

EXAMPLE 7

The lithium battery used in this example is a square lithium secondary battery including a positive electrode made of $LiCoO_2$, a negative electrode made of carbon electrochemically absorbing and releasing lithium ions, and an electrolyte made of organic electrolytic solution in which $LiPF_6$ is dissolved in a mixture of 50 vol % of ethylene carbonate and 50% vol of 1,2-dimethoxyethane. The battery has a size of 50 mm×80 mm×40 mm, and a rating capacity of 30 Wh. In this embodiment, five of these batteries were processed. First, each battery 15 was discharged using a resistor of 10Ω outside the battery processing apparatus shown in FIG. 2. The sliding plate 3a of the inlet chamber 2a was opened, and each battery 15 was placed in the chamber 2a. The plate 3a was closed and the plate 4a was opened, and the batteries 15 was carried into the processing chamber 1. A battery disjointing machine 19 having a diamond cutter and a cutter mixer was provided in the processing chamber 1. The upper portion of each battery vessel was cut using the diamond cutter of the battery disjointing machine 19. The upper portion of each battery 15 was removed, and battery components were taken out from the battery vessel.

The electrolytic solution on a separator, the battery vessel and electrodes was cleaned by 1,2-dimethoxyethane supplied from the sprayer 24a. The waste cleaning liquid was stored in a waste liquid storage vessel 28a by way of a liquid exhaust pipe 27a. The cleaned negative electrode was finely cut using the cutter mixer of the battery disjointing machine 19, and was stored in the PP vessel 20 having the bottom surface provided with a PP filter. The other battery members were placed on a belt conveyor 5 as they were. The belt conveyor 5 was driven, and the vessel 20 was moved directly under the nozzle 24b. The nozzle 24b provided the air containing ethanol and water vapor at 50/50% weight ratio (total 0.5–3.0 g/l) at 3 l/min to the negative electrode in the vessel 20. The processing time was 50 min.

The hydrogen concentration in the processing chamber 1 was 3% or less. After an elapse of about 40 min from the start of the processing, hydrogen was difficult to be generated as lithium alcoholate (alkoxide) with white color was precipitated, and the hydrogen concentration in the processing chamber 1 was 0.1% or less. After the supply of the ethanol + water vapor was stopped, the flow rate controller 22c was stopped, and only the air containing water vapor at 0.5 g/l was added to the negative electrodes from the nozzle 24b. The flow rate of air was 3 l/min. This processing time was 30 min. Finally, the air flow was switched off, and water (51) was supplied to the crushed pieces of the batteries.

The plate 4b was opened, and the vessel 20 and the electrode members were carried into the outlet chamber 2b. The plate 4b was closed and the plate 3b was opened, for removal of all of the processed battery components. The total time required for processing of the five batteries was 2.2–2.3 hr. The total volumes of the ethanol and water used in the processing of the negative electrodes were about 0.51 and 61, respectively. In all of the processes of this embodiment, the hydrogen concentration in the processing chamber 1 was suppressed to be 3% or less. The waste liquid in the waste liquid storage vessel 28a was distilled in vacuum, so that 95% of the total $LiPF_6$ contained in the five batteries could be recovered. The waste liquid obtained in the waste liquid storage vessels 28b was distilled, so that 30% of the total lithium contained in the batteries was recovered by electrolytic refining. From the crushed pieces obtained after the deactivation of negative electrodes, lithium was reproduced by extraction and reduction. The lithium amount was 55% of the total amount of lithium included in the batteries.

A battery having energy capacity being 10 times that of the lithium secondary battery processed in FIG. 1 can be continuously processed using the battery processing apparatus shown in FIG. 2. The processing time for each battery can be short, and the hydrogen generated upon processing was recovered in a produced gas storage vessel 14 containing $LaNi_5$ alloy, thereby ensuring the safety of the process. The waste processing liquids from respective processing chambers can be stored in separate tanks. This makes it possible to regenerate the electrolyte and lithium by fractional-recovering them, to simplify the distillation of the waste liquid stored in the waste liquid storage vessel 28b containing lithium ions of a high concentration, and to reduce the cost required in the process of enriching the waste liquid by the fractional-recovery.

EXAMPLE 8

A cylindrical 3 Wh lithium secondary battery including a positive electrode made of $V_6O_{13}$, a negative electrode made of Li metal, and a solid high molecular electrolyte made of a mixture of polyethylene oxide and $LiCF_3SO_3$ was processed using the battery processing apparatus shown in FIG. 2. In the same procedure as in the Example 6, five of the lithium secondary batteries were carried into the processing chamber 1, and were crushed using the battery crusher 19 having the hammer crusher and cutter mixer. The crushed pieces were put in the PP vessel 20 having the bottom surface provided with the PP filter. 1,2-dimethoxyethane stored in the liquid storage vessel 21a was sprayed from the sprayer 24a onto the crushed pieces. The waste cleaning liquid was stored in the waste liquid storage vessel 28a by way of the liquid exhaust pipe 27a. The vessel 20 was then moved directly under the nozzle 24b by the belt conveyor 5, and the nozzle 24b injected the ethanol and water vapor as used in Example 6 onto the crushed pieces in the vessel 20. The processing time was 20 min. After 15 min the hydrogen generating rate was decreased. Then air containing 0.5 g water in 1 l was supplied from the nozzle 24b. The unreacted alloy contained in the negative electrode was started to be decomposed, and hydrogen was generated. The processing time was 20 min. The waste liquid in the waste liquid storage vessel 28a was distilled in vacuum, so that 90% of the total $LiPF_6$ contained in the five batteries was recovered. The waste liquid obtained in the waste liquid storage vessel 28b was distilled, and 25% of the total lithium contained in the batteries was recovered by electrolytic refining. The recovered lithium from the crushed battery pieces was 57–60% of the total amount.

While the invention has been illustrated by several embodiments, it is not limited to them, and many variations, modifications and improvements are possible, within the scope of the inventive concept.

What is claimed is:

1. Apparatus for treatment of a battery comprising a component containing an alkali metal, said apparatus comprising means for opening an outer casing of said battery, a closable chamber to receive said battery, means for introducing to said chamber a gas containing at least one of water vapor and alcohol vapor and means for separating an alkali metal compound formed by reaction of said gas with said alkali metal from solid components of said battery.

2. Apparatus according to claim 1 wherein said means for introducing said gas to said chamber is adapted to provide said gas in the form of at least one of water vapor and alcohol vapor admixed with a gas selected from nitrogen, other inert gas and air.

3. Apparatus according to claim 1 wherein said means for introducing said gas to said chamber is adapted to provide said gas containing both water vapor and alcohol vapor.

4. Apparatus according to claim 1 having an entry port adapted to introduce a said battery to said chamber while substantially preventing access of water vapor therewith.

5. Apparatus according to claim 1 having a hydrogen concentration sensor for sensing hydrogen concentration in said chamber and means for adjusting the rate of introduction of said at least one of water vapor and alcohol vapor in dependence on the sensed hydrogen concentration.

6. Apparatus according to claim 1 having a temperature sensor for sensing temperature in said chamber and means for adjusting the rate of introduction of said at least one of water vapor and alcohol vapor in dependence on the sensed temperature.

7. Apparatus for treatment of a battery comprising a component containing an alkali metal, said apparatus comprising means for opening an outer casing of said battery, a closable chamber to receive said battery, means for introducing to said chamber a gas containing at least one of water vapor and alcohol vapor, a sensor for monitoring the reaction with alkali metal in said chamber and means for controlling the introduction of said gas in dependence on an output of said sensor.

8. Apparatus according to claim 7 wherein said sensor is selected from (a) a pressure sensor for sensing pressure in said chamber, (b) a temperature sensor for sensing temperature in said chamber and (c) a hydrogen concentration sensor for sensing hydrogen concentration in said chamber.

9. Apparatus for treatment of a battery comprising a component containing an alkali metal, said apparatus comprising a closable chamber having a plurality of intercommunicating compartments comprising at least (a) a first compartment provided with means for opening an outer casing of said battery, and (b) a second compartment having means for introducing thereto a gas containing at least one of water vapor and alcohol vapor for reaction with said alkali metal.

10. Apparatus according to claim 9 wherein said first compartment is provided with means for introducing an aprotic solvent for solution of an electrolyte of said battery.

11. Apparatus according to claim 9 wherein said chamber has a third compartment provided with means for introducing an alcohol thereto.

* * * * *